(12) United States Patent
Feng et al.

(10) Patent No.: US 10,473,974 B2
(45) Date of Patent: Nov. 12, 2019

(54) BACKLIGHT MODULE AND DISPLAY DEVICE HAVING THE SAME

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Wei Feng, Beijing (CN); Yang Zhang, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 45 days.

(21) Appl. No.: 15/750,319

(22) PCT Filed: Jul. 17, 2017

(86) PCT No.: PCT/CN2017/093135
§ 371 (c)(1),
(2) Date: Feb. 5, 2018

(87) PCT Pub. No.: WO2018/072495
PCT Pub. Date: Apr. 26, 2018

(65) Prior Publication Data
US 2019/0011778 A1    Jan. 10, 2019

(30) Foreign Application Priority Data
Oct. 19, 2016   (CN) .......................... 2016 1 0912529

(51) Int. Cl.
*G02F 1/1335* (2006.01)
*G02F 1/1339* (2006.01)
(Continued)

(52) U.S. Cl.
CPC ...... *G02F 1/133602* (2013.01); *G02B 6/0011* (2013.01); *G02F 1/1339* (2013.01);
(Continued)

(58) Field of Classification Search
CPC ............... G02B 6/0085; G02F 1/33308; G02F 1/133385; G02F 1/133602
See application file for complete search history.

(56) References Cited

U.S. PATENT DOCUMENTS

2016/0207065 A1   7/2016  Lee et al.
2017/0336668 A1* 11/2017 Xu ...................... G02F 1/1333

FOREIGN PATENT DOCUMENTS

CN         1877417 A    12/2006
CN       101126862 A    2/2008
(Continued)

OTHER PUBLICATIONS

First Office Action dated Jan. 30, 2019 corresponding to Chinese application No. 201610912529.X.
You, Jaegeon, et al."Improvement of Dark State Light Leakage in ADS Mode LCDS"; SID 2015 Digest; Beijing, China; 2015; pp. 1544-1547.
(Continued)

*Primary Examiner* — Robert J May
*Assistant Examiner* — Leah Simone MacChiarolo
(74) *Attorney, Agent, or Firm* — Nath, Goldberg & Meyer; Joshua B. Goldberg; Stanley N. Protigal

(57) ABSTRACT

Disclosed are a backlight module and a display device having the same. The backlight module includes an optical assembly including a light guide plate, a plastic frame and an optical film disposed on a light-emitting side of the light guide plate. The plastic frame includes a side wall and a bearing portion formed on the top of the side wall of plastic frame and located on the light-emitting side of the light guide plate, the side wall of plastic frame is arranged to surround the light guide plate, the bearing portion extends from the top of the side wall of plastic frame to the light
(Continued)

guide plate, and a side surface of the bearing portion faces a side surface of the optical film. The backlight module according to the disclosure can reduce the optical retardation of the display device, thereby reducing the dark-state light leakage of the display device.

14 Claims, 1 Drawing Sheet

(51) Int. Cl.
  G02F 1/1333 (2006.01)
  F21V 8/00 (2006.01)

(52) U.S. Cl.
  CPC .. G02F 1/133308 (2013.01); G02F 1/133385 (2013.01); G02F 1/133615 (2013.01); *G02B 6/0085* (2013.01); *G02B 6/0086* (2013.01)

(56) References Cited

FOREIGN PATENT DOCUMENTS

| | | |
|---|---|---|
| CN | 102809132 A | 12/2012 |
| CN | 202580990 U | 12/2012 |
| CN | 202852594 U | 4/2013 |
| CN | 103824518 A | 5/2014 |
| CN | 205065450 U | 3/2016 |
| CN | 106569362 A | 4/2017 |

OTHER PUBLICATIONS

Yang, Yafeng, et al."Simulation and Experimental Study on Light Leakage in ADS Mode LCDs"; SID 2014 Digest; Beijing, China; 2014; pp. 1251-1254.
International Search Report dated Oct. 27, 2017 corresponding to application No. PCT/CN2017/093135.
Second Office Action dated Sep. 3, 2019, in corresponding application 201610912529.X, with English translation.

* cited by examiner

BACKLIGHT MODULE AND DISPLAY DEVICE HAVING THE SAME

CROSS-REFERENCE TO RELATED APPLICATION

This is a National Phase Application filed under 35 U.S.C. 371 as a national stage of PCT/CN2017/093135, filed on Jul. 17, 2017, an application claiming the priority of China Patent Application No. 201610912529.X filed with the Chinese Intellectual Property Office on Oct. 19, 2016, entitled "Backlight Module and Display Device", the disclosure of which is incorporated herein by reference Incorporated.

FIELD

An embodiment of the present disclosure relates to the field of display technologies, and in particular, to a backlight module and a display device having the same.

BACKGROUND

At present, modes of liquid crystal display mainly include a Twisted Nematic mode, a Vertical Alignment mode, an In-Plane Switching (IPS) mode and an Advanced Super Dimension Switching (ADS) mode. A thin film transistor liquid crystal display of the ADS mode forms a multidimensional electric field between a slit electrode layer and a plate electrode layer through the electric field generated by an edge of a slit electrode in the same plane, so that between the slit electrodes in a liquid crystal cell and all oriented liquid crystal molecules directly above the electrodes are able to rotate, thereby improving the liquid crystal working efficiency and increasing the light transmittance. Therefore, the ADS technology can improve the picture quality of thin film transistor liquid crystal display products. In addition, the ADS technology also has the advantages of high resolution, high transmittance, low power consumption, wide viewing angle, high aperture ratio, low chromatic aberration and no squeezing water ripples. For this reason, it has more and more drawn people's attention and favour.

However, there are birefringence phenomena in the thin-film transistor liquid crystal display of the ADS mode and the thin-film transistor liquid crystal display of the IPS mode due to their material properties, for example. Birefringence may cause optical retardation in LCDs, and the optical retardation may lead to dark-state light leakage. When a frame of the backlight module of the thin film transistor liquid crystal display of these modes is deformed, a small gap between the frame and a display panel is inclined to cause the display panel to be squeezed. At the same time, a large gap (about 5~10 mm) between the display panel and an optical film is inclined to cause the display panel to bend and deform. These factors can aggravate the birefringence phenomenon of LCD.

Therefore, how to reduce the dark-state light leakage of the liquid crystal display has become a technical problem to be solved in the present disclosure.

SUMMARY

As a first aspect of the disclosure, there is provided a backlight module comprising an optical assembly. The optical assembly includes a light guide plate, a plastic frame and an optical film disposed on a light-emitting side of the light guide plate, the plastic frame comprises a side wall and a bearing portion formed on the top of the side wall of the plastic frame and located on the light-emitting side of the light guide plate, the side wall of the plastic frame is arranged to surround the light guide plate, the bearing portion extends from the top of the side wall of the plastic frame to the light guide plate, and a side surface of the bearing portion faces a side surface of the optical film.

Optionally, a light-emitting surface of the optical film is formed as a curved surface that is recessed towards the light guide plate.

Optionally, the backlight module further comprises a back plate and a heat dissipation frame, the heat dissipation frame is disposed in an inner cavity formed by the back plate, the optical assembly is disposed on the heat dissipation frame, and the plastic frame is arranged to surround sidewalls of the back plate for fixedly connecting the optical assembly and the heat dissipation frame to the back plate.

Optionally, the heat dissipation frame includes a main body portion and a support portion located at a periphery of the main body portion, one end of the support portion is connected to the main body portion, the other end of the support portion is in contact with the optical assembly such that a cavity is formed between the main body portion and the optical assembly, and the main body portion is attached to at least a portion of a bottom wall of the back plate.

Optionally, the heat dissipation frame further comprises a side portion located on a side of the support portion far away from the cavity, the side portion is provided with at least one light source accommodating cavity, and the backlight module further includes a light source disposed in the at least one light source accommodating cavity and emitting light toward the side surface of the light guide plate.

Optionally, the backlight module further includes a first spacer located between the bearing portion and the light guide plate.

Optionally, a surface of the bearing portion far away from the light guide plate is provided with an adhesive.

Optionally, the bearing portion in a stepwise form includes a first portion, a second portion, and a third portion, wherein the third portion extends parallel to and inwardly of the first portion, the second portion is perpendicular to first portion and the third portion and connects the first portion and the third portion, and a side surface of the third portion faces a side surface of the optical film.

As a second aspect of the disclosure, there is provided a display device, comprising a backlight module and a display panel disposed on a light-emitting side of the backlight module, wherein the backlight module comprises the backlight module as set forth, and the display panel is adhered to a surface of the bearing portion far away from the light guide plate.

Optionally, the display device further includes a second spacer, a first adhesive layer disposed on a surface of the second pad facing the display panel, and a second adhesive layer disposed on a surface of the second spacer facing the bearing portion, the second spacer is adhered to the display panel through the first adhesive layer, and the second spacer is adhered to the bearing portion through the second adhesive layer.

Optionally, under the condition that the display panel is formed as a curved display panel and the light emitting surface of the optical film is formed as a curved surface recessed toward the light guide plate, the curved surface of the display panel has a curvature smaller than that of the optical film.

BRIEF DESCRIPTION OF THE DRAWINGS

The accompanying drawings, which are included to provide a further understanding of the disclosure and constitute a part of the specification, are used in conjunction with the following specific embodiments to explain the disclosure and are not intended to limit the disclosure, in the drawings.

DETAILED DESCRIPTION OF THE EMBODIMENTS

Figure 1:
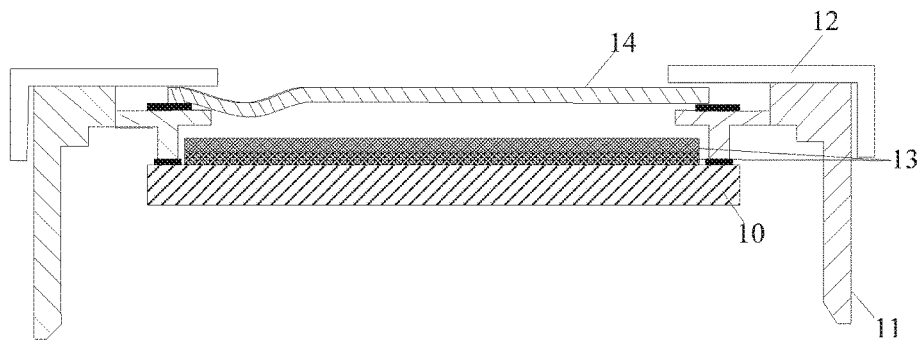
FIG. 1 is a schematic cross-sectional view of an assembly structure of a backlight module and a display panel in the related art.

Hereinafter the specific embodiments of the present disclosure will be described in detail with reference to the accompanying drawings. It should be understood that the specific embodiments described herein are only provided for descriptive and illustrative purpose but not intended to limit the disclosure.

It should be noted that the positional terms "upper", "lower" and the like as mentioned in the disclosure all refer to the directions shown in the drawings of the specification.

In order to understand specific embodiments of the present disclosure more clearly by those skilled in the art, the birefringence phenomenon of the thin film transistor liquid crystal display device in the ADS mode and the thin film transistor liquid crystal display device in the IPS mode will be briefly explained. Birefringence means that two different refractive indices are shown when light transmits through a material. This phenomenon can be observed in many crystals. Isotropic material in the case of external forces will also incur anisotropic phenomenon. That is, the refractive index thereof is not the same under different stress state. A magnitude of the refractive index at a certain point of the photo-elastic material is directly related to a state of the external force at that point. Glass under the action of external force can show the birefringence phenomenon. The relationship between an amount of the optical retardation and the external force is as follows:

Retardation_magitude=$Ct|\Delta x - \Delta y|$, optic_axis~min $(\Delta x, \Delta y)$, wherein, C is the photo-elastic coefficient of the glass, t is a thickness of the glass, and $\Delta_x$ and $\Delta_y$ are external forces generated in x, y plane of the glass, respectively. A direction of optical axis coincides with a direction of the minimum in $\Delta_x$ and $\Delta_y$.

In summary, in addition to the optical retardation of the display device due to the birefringence of the material itself, the external force may also increase the amount of the optical retardation of the display device and eventually lead to the generation of dark-state light leakage.

Therefore, the dark-state light leakage of the display device due to the external force can be alleviated by removing a bezel in the backlight module or reducing a gap between the display panel and the optical film. The inventor of the present disclosure has found that in addition to the dark-state light leakage due to the birefringence phenomenon of the liquid crystal material itself, a structure of the display device may also aggravate the phenomenon of dark-state light leakage. FIG. 1 is a schematic diagram of an assembly structure of a liquid crystal display device.

Specifically, the liquid crystal display device shown in FIG. 1 in the related art includes a display panel 14 and a backlight module, and the backlight module includes an optical assembly and a plastic frame for fixing the optical assembly. In order to assemble the display panel and the backlight module together, the liquid crystal display device further includes a bezel 12. However, the bezel 12 of the backlight module is inclined to be deformed in the process of assembly. In this regard, the deformation of the bezel 12 may result in a relatively small gap between the bezel 12 and the display panel 14, thereby compressing the display panel 14. Alternatively, the gap between the bezel 12 and the display panel 14 is designed to be small to easily produce a compression against the display panel 14. In addition, a large gap between the display panel 14 and the optical film 13 (about 5 to 10 mm) is inclined to cause the display panel 14 to be bent and deformed. These external forces can increase the occurrence of dark-state light leakage of the liquid crystal displays.

Figure 2:
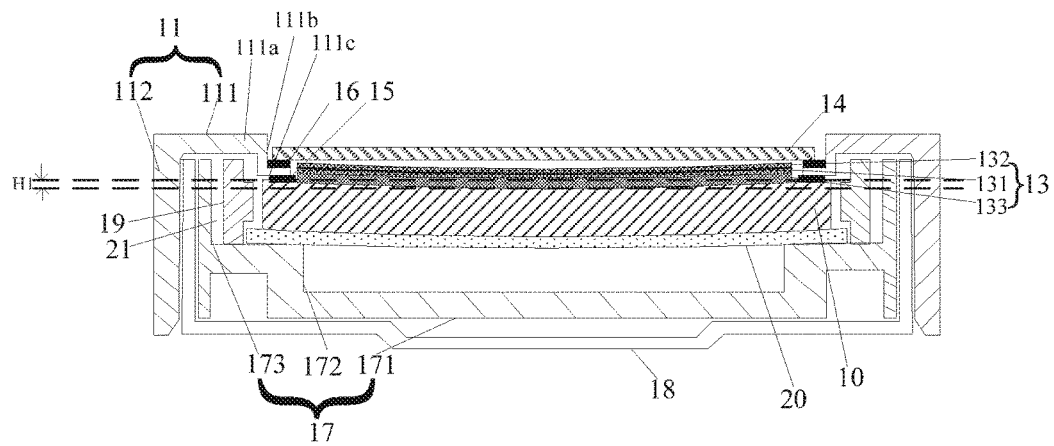
FIG. 2 is a schematic cross-sectional view of an assembly structure of a backlight module and a display panel according to an embodiment of the present disclosure.

In order to at least partially alleviate the phenomenon of dark-state light leakage of the liquid crystal display that is exacerbated by the external force, as a first aspect of the present disclosure, there is provided a backlight module. As shown in FIG. 2, the backlight module includes an optical assembly including a light guide plate 10, a plastic frame 11, and an optical film 13 disposed on a light-emitting side of the light guide plate 10. The plastic frame 11 includes a side wall 112 and a bearing portion 111 formed on the top of the side wall 112 of the plastic frame and located on the light emitting side of the light guide plate 10. The side wall 112 of the plastic frame is arranged to surround the light guide plate 10. The bearing portion 111 extends from the top of the side wall 112 of the plastic frame to the light guide plate 10. A side surface of the bearing portion 111 faces a side surface of the optical film 13.

In the backlight module according to the present disclosure, the side surface of the bearing portion is opposite to the side surface of the optical film. Compared with the prior art, when the backlight module is applied to a display device, the distance between the display panel and the optical film can be shortened. Therefore, it is possible to prevent the deformation of the display panel due to a large distance between the display panel and the optical film. As a result, the amount of the optical retardation of the display device can be reduced, thereby alleviating the dark-state light leakage of the display device. Further, the bearing portion 111 in a stepwise shape includes a first portion 111a, a second portion 111b, and a third portion 111c, wherein the third portion 111c extends parallel to and inwardly of the first portion 111a, and the second portion 111b is perpendicular to the first portion 111a and the third portion 111c and connects the first portion 111a and the third portion 111c. A side surface of the third portion 111c faces a side surface of the optical film 13.

It should be understood that the plastic frame 11 is disposed on the periphery of the light guide plate 10. Preferably, the bearing portion 111 has a thickness ranging from 1 mm to 2 mm. It can be seen by comparing FIG. 2 to FIG. 1 that in the backlight module according to the present disclosure, the side surface of the third portion 111c of the bearing portion 111 surrounds an outer periphery of the optical film 13, while the bearing portion of the plastic frame 11 as shown in FIG. 1 is provided on the upper portion of the optical film 13. Therefore, in the backlight module according to the present disclosure, there is no space between the bearing portion 111 and the optical film 13 in a vertical direction. When the display panel 14 is mounted to the backlight module, the display panel 14 is supported by the third portion 111c of the bearing portion 111, surrounded by the second portion 111b, and positioned directly over the optical film 13. In contrast, in the conventional backlight module shown in FIG. 1, the bearing portion is located between the display panel 14 and the optical film 13 in the vertical direction and supports the display panel 14. Therefore, the backlight module according to the present disclosure can significantly reduce the gap between the display panel 14 and the optical film 13, avoiding the bending and deformation of the display panel 14. As a result, the amount of optical retardation of the display device due to external forces can be reduced, thereby alleviating the dark-state light leakage of the display device.

In order to prevent the rubbing or scratching of the display panel 14 against the optical film 13 by contact due to the reduced distance between the display panel 14 and the optical film 13, the optical film 13 can be made slightly sunk toward the light guide plate 10.

It can be seen from FIG. 2 that an upper surface of the optical film 13 is recessed downward to form a curved surface. In order not to affect optical characteristics of the optical film 13, the curved surface has a concave depth ranging from 1 mm to 2 mm. In this way, the display panel 14 can be prevented from contacting and rubbing against the upper surface of the optical film 13 without affecting the optical characteristics of the optical film 13.

It can be understood that, since the optical film 13 is attached to the light guide plate 10, the light guide plate 10 can be recessed along with the optical film 13. The concave depth of the optical film 13 and the light guide plate 10 is shown as a concave depth H1 in FIG. 2. As mentioned above, H1 ranges from 1 mm to 2 mm.

It should be noted that, as shown in FIG. 2, the optical film 13 includes, from bottom to top, a diffusion sheet 133, a lower prism sheet 131 and an upper prism sheet 132 which are sequentially arranged. A lower surface of the diffusion sheet 133 is in contact with a light-emitting surface of the light guide plate 10.

As shown in FIG. 2, in order to achieve the fixation and heat dissipation of the backlight module, the backlight module further includes a back plate 18 and a heat dissipation frame 17. The heat dissipation frame 17 is disposed in an inner cavity formed by the back plate 18. The optical assembly is disposed on the heat dissipation frame 17. The plastic frame 11 is arranged to surround sidewalls of the back plate 18 for fixedly connecting the optical assembly and the heat dissipation frame 17 to the back plate 18.

More specifically, the heat dissipation frame 17 includes a main body portion 171 and a support portion 172 located at a periphery of the main body portion 171. One end of the support portion 172 is connected to the main body portion 171 and the other end of the support portion 172 is in contact with the optical assembly, such that a cavity is formed between the main body portion 171 and the optical assembly. The main body portion 171 is attached to at least a portion of a bottom wall of the back plate 18.

As can be seen from FIG. 2, in the structure of the heat dissipation frame 17, the cavity can be formed between the main body portion 171 and the optical component. When the light guide plate 10 and the optical film 13 in the optical assembly are recessed, the cavity can accommodate a portion of the light guide plate 10 bent toward the cavity.

As shown in FIG. 2, the heat dissipation frame 17 further includes a side portion 173. The side portion 173 is located on a side of the support portion 172 far away from the cavity, and the side portion 173 is provided with at least one light source accommodating cavity 21. The backlight module further includes a light source 19 disposed in the at least one light source accommodating cavity 21 and emitting light toward the side surface of the light guide plate 10.

The light source 19 included in the backlight module as described above can provide a backlight for the backlight module.

It should be understood that the side portions 173 of the heat dissipation frame 17 are disposed on the outer periphery of the light guide plate 10. Therefore, the light source accommodating cavities 21 are formed on the periphery of the light guide plate 10. Preferably, in order to ensure that the light emitting surface of the light guide plate 10 emits light uniformly, as shown in FIG. 2, two light sources 19 are symmetrically disposed. Correspondingly, two light sources 19 are disposed in two light source accommodating cavities 21, respectively, which are arranged symmetrically.

As an example, the backlight module shown in FIG. 2 is a side-in type light emitting structure. The optical assembly shown in FIG. 2 further includes a reflective plate 20. In order to make full use of the light emitted from the light source 19, the light emitted from the light source 19 can be reflected by the reflective plate 20 and then emitted uniformly through the light-emitting surface of the light guide plate 10. It should also be understood that the backlight module according to the present disclosure is not particularly limited to the form of the light emitting structure, and for example, a direct type light emitting structure can be employed herein.

In order to prevent the bearing portion 111 from directly contacting with the light guide plate 10 to generate friction, the backlight module may further include a first spacer 15. The first spacer 15 is located between the bearing portion 111 and the light guide plate 10. As shown in FIG. 2, one surface of the first spacer 15 is in contact with the light-emitting surface of the light guide plate 10 and the other surface of the first spacer 15 is in contact with the surface of the supporting portion 111 facing the light guide plate 10. Thus, the surface of the supporting portion 111 can be prevented from direct contacting the light-emitting surface of the light guide plate 10.

When the backlight module is applied in a display device and assembled with the display panel 14, the backlight module is adhered to the display panel 14 through the bearing portion 111 to provide a fixation of the display panel. In order to bond the bearing portion 111 to the display panel, preferably, a surface of the bearing portion 111 far away from the light guide plate 10 may be coated with an adhesive (not shown). When the display panel 14 is assembled with the backlight module, the bearing portion 111 can be adhered to the display panel 14 by the adhesive applied to an upper surface of the bearing portion 111, so as to provide the fixation of the display panel 14. Compared with the prior art, the backlight module according to the present disclosure does not provide the bezel, thereby simplifying the structure of the backlight module. Importantly, due to the lack of the bezel, the dark-state light leakage caused by the deformation of the bezel and the squeeze of the display panel can be solved.

It can be understood that the adhesive may also be applied to the display panel. When the display panel is being assembled with the backlight module, the display panel can be fixed to the backlight module through the adhesive on the display panel.

As a second aspect of the present disclosure, there is provided a display device. As shown in FIG. 2, the display device includes a backlight module and a display panel 14 disposed on a light-emitting side of the backlight module, wherein the backlight module is the backlight module described above, and the display panel 14 is adhered on the surface of the bearing portion 111 far away from the light guide plate 10.

According to the display device in the embodiments of the present disclosure, by using the backlight module as described above, when the backlight module and the display panel being are assembled, the display panel can be fixed to the backlight module by the adhesive. Compared with the prior art, the bezel is not provided so as to avoid the problem that the birefringence phenomenon is aggravated due to a panel squeezed by the deformation of the bezel.

It can be understood that, the adhesive herein may be coated on the surface of the bearing portion 111 far away from the light guide plate 10 or may be coated on the surface of the display panel 14 facing the backlight module or may be coated both on the surface of the bearing portion 111 far away from the light guide plate 10 and the surface of the display panel 14 facing the backlight module. This is not limited herein.

In order to prevent the display panel 14 from directly contacting with the bearing portion 111 to generate friction, as shown in FIG. 2, the display device may further include a second spacer 16, a first adhesive layer (not shown) disposed on a surface of the second spacer 16 facing the display panel 14 and a second adhesive layer (not shown) disposed on a surface of the second spacer 16 facing the bearing portion 111, wherein the second spacer 16 is adhered to the display panel 14 through the first adhesive layer, and the second spacer 16 is adhered to the bearing portion 111 through the second adhesive layer.

Specifically, taking the structure shown in FIG. 2 as an example, an upper surface of the second spacer 16 is provided with the first adhesive layer for adhering the display panel 14 and the second spacer 16, and a lower surface of the second spacer 16 is provided with the second adhesive layer for adhering the bearing portion 111 and the second spacer 16. In this way, the bearing portion 111 can be prevented from directly contacting with the display panel 14 by providing the second spacer 16. The display panel 14 and the bearing portion 111 are adhered by the adhesive layers on the upper and lower surfaces of the second spacer 16, so that the fixation of the display panel 14 to the backlight module can be completed.

Figure 3:
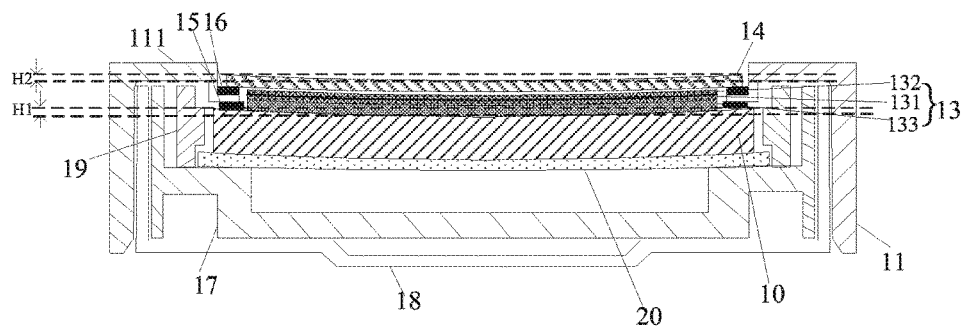
FIG. 3 is a schematic cross-sectional view of an assembly structure of a backlight module and a curved display panel according to an embodiment of the present disclosure.

As a preferred embodiment, as shown in FIG. 3, in the case that the display panel 14 is a curved display panel and the light-emitting surface of the optical film 13 is formed as a curved surface that is recessed towards the light guide plate 10, in order to prevent the friction between the display panel 14 and the optical film 13 due to the contact, the curved surface of the display panel has a curvature smaller than that of the optical film 13. In this way, the contact between the curved display panel 14 and the upper surface of the optical film 13 can be avoided, thereby eliminating the occurrence of friction.

Specifically, as shown in FIG. 3, the display panel 14 is a curved display panel. Assuming that the concave depth of the curved display panel facing the light guide plate 10 is H2 and the concave depth of the optical component 13 is H1, H2 is considered as being less than H1.

In the display device according to the embodiments of the present disclosure, since the backlight module as described above is used and the display panel is fixed to the backlight module by the adhesive, the bezel is not provided to avoid the optical retardation due to the display panel squeezed by the deformation of the bezel. In the meanwhile, since the bearing portion in the backlight module is disposed on the side portion of the light guide plate, a distance between the display panel and the optical film can be shortened, thereby alleviating the birefringence phenomenon of the display device. In this way, according to the present disclosure, it is possible to improve the dark-state light leakage of the display device. In addition, the structure of the backlight module is simplified so that the cost can be saved.

It can be understood that the above embodiments are merely exemplary embodiments provided for illustrating the principle of the present disclosure, but the disclosure is not limited thereto. For those skilled in the art, various variations and improvements may be made without departing from the spirit and essence of the present disclosure, and these variations and improvements are also considered as falling into the scope of the present disclosure.

The invention claimed is:

1. A backlight module, comprising an optical assembly, wherein
   the optical assembly includes a light guide plate, a plastic frame and an optical film disposed on a light-emitting side of the light guide plate,
   the plastic frame comprises a side wall and a bearing portion formed on the top of the side wall of the plastic frame and located on the light-emitting side of the light guide plate,
   the side wall of the plastic frame is arranged to surround the light guide plate,
   the bearing portion extends from the top of the side wall of the plastic frame to the light guide plate, and
   a side surface of the bearing portion faces a side surface of the optical film,
   wherein
   a light-emitting surface of the optical film is formed as a curved surface that is recessed towards the light guide plate.

2. The backlight module according to claim 1, wherein the backlight module further comprises a back plate and a heat dissipation frame,
   the heat dissipation frame is disposed in an inner cavity formed by the back plate,
   the optical assembly is disposed on the heat dissipation frame, and
   the plastic frame is arranged to surround sidewalls of the back plate for fixedly connecting the optical assembly and the heat dissipation frame to the back plate,
   the heat dissipation frame includes a main body portion and a support portion located at a periphery of the main body portion,
   one end of the support portion is connected to the main body portion, and the other end of the support portion is in contact with the optical assembly such that a cavity is formed between the main body portion and the optical assembly, and
   the main body portion is attached to at least a portion of a bottom wall of the back plate.

3. The backlight module according to claim 2, wherein
   the heat dissipation frame further comprises a side portion located on a side of the support portion far away from the cavity, and the side portion is provided with at least one light source accommodating cavity, and
   the backlight module further includes a light source disposed in the at least one light source accommodating cavity and emitting light toward the side surface of the light guide plate.

4. The backlight module according to claim 1, wherein the bearing portion in a stepwise shape includes a first portion, a second portion, and a third portion, wherein the third portion extends parallel to and inwardly of the first portion, the second portion is perpendicular to first portion and the third portion and connects the first portion and the third portion, and a side surface of the third portion faces a side surface of the optical film.

5. A display device, comprising:
a backlight module including an optical assembly, wherein the optical assembly includes a light guide plate, a plastic frame and an optical film disposed on a light-emitting side of the light guide plate, the plastic frame comprises a side wall and a bearing portion formed on the top of the side wall of the plastic frame and located on the light-emitting side of the light guide plate, the side wall of the plastic frame is arranged to surround the light guide plate, the bearing portion extends from the top of the side wall of the plastic frame to the light guide plate and a side surface of the bearing portion faces a side surface of the optical film; and
a display panel disposed on a light-emitting side of the backlight module, wherein the display panel is adhered to a surface of the bearing portion far away from the light guide plate, wherein
a light-emitting surface of the optical film is formed as a curved surface that is recessed towards the light guide plate.

6. The display device according to claim 5, wherein the backlight module further comprises a back plate and a heat dissipation frame,
the heat dissipation frame is disposed in an inner cavity formed by the back plate,
the optical assembly is disposed on the heat dissipation frame, and
the plastic frame is arranged to surround sidewalls of the back plate for fixedly connecting the optical assembly and the heat dissipation frame to the back plate.

7. The display device according to claim 6, wherein the heat dissipation frame includes a main body portion and a support portion located at a periphery of the main body portion,
one end of the support portion is connected to the main body portion, and the other end of the support portion is in contact with the optical assembly such that a cavity is formed between the main body portion and the optical assembly, and
the main body portion is attached to at least a portion of a bottom wall of the back plate.

8. The display device according to claim 7, wherein the heat dissipation frame further comprises a side portion located on a side of the support portion far away from the cavity, and the side portion is provided with at least one light source accommodating cavity, and
the backlight module further includes a light source disposed in the at least one light source accommodating cavity and emitting light toward the side surface of the light guide plate.

9. The display device according to claim 5, wherein the backlight module further includes a first spacer located between the bearing portion and the light guide plate.

10. The display device according to claim 5, wherein a surface of the bearing portion far away from the light guide plate is provided with an adhesive.

11. The display device according to claim 5, wherein the bearing portion in a stepwise shape includes a first portion, a second portion, and a third portion, wherein the third portion extends parallel to and inwardly of the first portion, the second portion is perpendicular to first portion and the third portion and connects the first portion and the third portion, and a side surface of the third portion faces a side surface of the optical film.

12. The display device according to claim 5, further comprising a second spacer, a first adhesive layer disposed on a surface of the second spacer facing the display panel, and a second adhesive layer disposed on a surface of the second spacer facing the bearing portion,
the second spacer is adhered to the display panel through the first adhesive layer, and
the second spacer is adhered to the bearing portion through the second adhesive layer.

13. The display device according to claim 5, wherein under the condition that the display panel is formed as a curved display panel and the light emitting surface of the optical film is formed as a curved surface recessed toward the light guide plate, the curved surface of the display panel has a curvature smaller than that of the optical film.

14. The display device according to claim 12, wherein under the condition that the display panel is formed as a curved display panel and the light emitting surface of the optical film is formed as a curved surface recessed toward the light guide plate, the curved surface of the display panel has a curvature smaller than that of the optical film.

* * * * *